United States Patent
Pan et al.

(10) Patent No.: US 8,134,964 B2
(45) Date of Patent: Mar. 13, 2012

(54) NETWORK ADDRESS ASSIGNING AND ALLOCATING METHOD AND ROUTING METHOD FOR LONG-THIN WIRELESS NETWORK

(75) Inventors: Meng-Shiuan Pan, Yilan County (TW); Hua-Wei Fang, Kaohsiung (TW); Yung-Chih Liu, Taipei (TW); Yu-Chee Tseng, Hsinchu (TW)

(73) Assignee: Institute for Information Industry, Taipei (TW)

( * ) Notice: Subject to any disclaimer, the term of this patent is extended or adjusted under 35 U.S.C. 154(b) by 937 days.

(21) Appl. No.: 12/141,083

(22) Filed: Jun. 18, 2008

(65) Prior Publication Data
US 2009/0268633 A1  Oct. 29, 2009

(30) Foreign Application Priority Data
Apr. 23, 2008 (TW) ................................ 97114899 A (51) Int. Cl.
*H04W 4/00* (2009.01)
(52) U.S. Cl. ........................................................ 370/329
(58) Field of Classification Search .................. 370/329
See application file for complete search history.

(56) References Cited

U.S. PATENT DOCUMENTS

| | | | |
|---|---|---|---|
| 7,822,002 B2* | 10/2010 | Narayanan et al. | 370/338 |
| 2005/0122955 A1* | 6/2005 | Lin et al. | 370/351 |
| 2005/0180447 A1 | 8/2005 | Lim et al. | |
| 2006/0023643 A1* | 2/2006 | Lim | 370/254 |
| 2006/0029002 A1* | 2/2006 | Park et al. | 370/254 |
| 2007/0036090 A1 | 2/2007 | Bhatti | |
| 2007/0060143 A1 | 3/2007 | Bhatti | |
| 2009/0141726 A1* | 6/2009 | Fang et al. | 370/394 |
| 2010/0042703 A1* | 2/2010 | Lelkens et al. | 709/220 |
| 2010/0110931 A1* | 5/2010 | Shim et al. | 370/254 |

* cited by examiner

*Primary Examiner* — Kenny Lin
(74) *Attorney, Agent, or Firm* — Jianq Chyun IP Office (57) ABSTRACT

A network address assigning and allocating method and a routing method for a long-thin wireless network are provided. First, a plurality of nodes in the long-thin wireless network is classified into a plurality of clusters, in which nodes ranging from a child node of a bridge node to a next bridge node are classified as the same cluster. Then, a network address is assigned to each of the nodes, in which the network address includes a cluster ID and a node ID, the cluster ID is used for identifying the clusters and for routing a packet between the clusters, and the node ID is used for identifying the nodes in each of the clusters and for routing a packet in the cluster. Thereby, the routing and network transmitting efficiency of the long-thin wireless network can be improved.

17 Claims, 4 Drawing Sheets

NETWORK ADDRESS ASSIGNING AND ALLOCATING METHOD AND ROUTING METHOD FOR LONG-THIN WIRELESS NETWORK

CROSS-REFERENCE TO RELATED APPLICATION

This application claims the priority benefit of Taiwan application serial no. 97114899, filed on Apr. 23, 2008. The entirety of the above-mentioned patent application is hereby incorporated by reference herein and made a part of this specification.

BACKGROUND OF THE INVENTION

1. Field of the Invention

The present invention generally relates to a long-thin wireless network, and in particular, to a network address assigning and allocating method and a routing method for a long-thin wireless network.

2. Description of Related Art

In recent years, many wireless network applications, such as tour guide service, positioning service, and environment monitoring, have been developed along with the rapid advancement of wireless network technology. In these applications, the nodes in a wireless network are connected in a multi-hop pattern, and when a particular data source node is about to transmit data to a target node, the data has to be relayed by some intermediate nodes. Most environment monitoring applications adopt such a network transmission pattern. However, in a multi-hop network, different type of network topology should be adopted according to different application. For example, the network could be a star network, a tree network, a long-thin network, or an ultra-long-thin network, etc.

Figure 1:
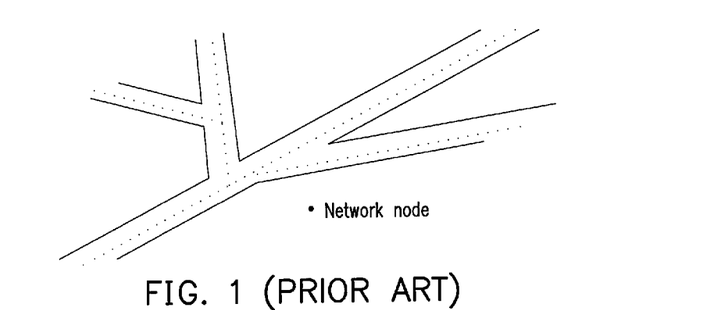
FIG. 1 is a diagram of a conventional ultra-long-thin network.

FIG. 1 is a diagram of a conventional ultra-long-thin network. Referring to FIG. 1, most nodes in the network are connected in a long-thin pattern, and the other nodes are connected to those long-thin nodes to serve as communication bridges in between. Such a network topology is adopted by many environment monitoring applications, such as highway lamp monitoring, tunnel monitoring, oil pipeline monitoring, and gas pipeline monitoring, etc.

It is a difficult work to assign network addresses to nodes in such an ultra-long-thin network. The allocation of network addresses is generally categorized into manual allocation and automatic allocation. It is very timing-consuming to manually allocate network addresses in such an ultra-long-thin network, while most existing automatic network address allocating methods designed especially for wireless networks require very complicated calculations and cannot guarantee that a unique network address is assigned to each of the network nodes.

Recently, a low-complexity address assigning algorithm is provided by the ZigBee alliance. According to this algorithm, an address calculation method similar to a geometric proportion expression is adopted for assigning addresses, and each network node has to be assigned with a 16-bit network address, otherwise the network node will not be considered as a network member. A distributed network address assigning algorithm is designed by the ZigBee alliance, in which the nodes in a network compete to become a ZigBee coordinator when the network is just started. Assuming that a specific device successfully becomes the ZigBee coordinator, the ZigBee coordinator scans all the wireless channels and determines a suitable operation channel. After that, the ZigBee coordinator broadcasts a beacon frame to allow other devices to join its network. When another device receives the beacon frame, it executes a process to join the network and accordingly becomes a ZigBee router or a ZigBee end device.

If a specific device becomes a ZigBee router, the ZigBee router also broadcasts a beacon frame to allow other devices which have not joined the network to join the network. Whenever a device successfully joins the network, the transmitter of the beacon frame allocates a network address to the device as an identification (ID) for transmitting data subsequently. The ZigBee coordinator first defines the maximum number of devices to be connected to a ZigBee router (Cm), the maximum number of ZigBee sub-routers (Rm), and the depth of the network (Lm). It is specified by ZigBee alliance that Cm≧Rm. Accordingly, at least (Cm-Rm) ZigBee end devices can be connected to a ZigBee router.

According to the ZigBee specification, the network address of a device is allocated by a parent node thereof. As to a ZigBee coordinator, the address space of the entire network is divided into Rm+1 blocks, in which the address space of the first Rm blocks is assigned to Rm sub-routers thereof, and the remaining portion is kept for (Cm-Rm) ZigBee end devices connected thereto. In the present algorithm, a ZigBee router calculates a parameter Cskip using Cm, Rm, and Lm and then calculates and assigns network addresses to its sub-routers and end-devices by using the parameter Cskip. Assuming that the ZigBee router is located at the $d^{th}$ level of the network, then the value of the parameter Cskip can be calculated through:

$$Cskip(d) = \begin{cases} 1 + Cm \cdot (Lm - d - 1), & \text{if } Rm = 1 \\ \dfrac{1 + Cm - Rm - Cm \cdot Rm^{Lm-d-1}}{1 - Rm}, & \text{Otherwise.} \end{cases}$$

According to the ZigBee specification, a ZigBee coordinator is located at depth 0 of a network. Assuming a router x is located at depth d and a node y is a child of the router x, then Cskip(d) represents the maximum number of nodes (including the node y) in a subtree having the node y as its root. On the other hand, the assigning of network addresses is started from the ZigBee coordinator, in which the ZigBee coordinator assigns 0 as its own address and depth. Assuming that the address of a parent node located at depth d is $A_{parent}$, the parent node then assigns $A_{parent}$+(n−1)×Cskip(d)+1 as the address of its $n^{th}$ sub-router and $A_{parent}$+Rm×Cskip(d)+n as the address of its $n^{th}$ end device.

Figure 2:
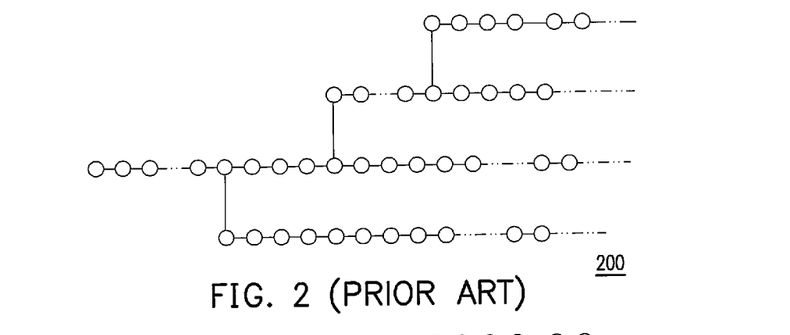
FIG. 2 illustrates an example of an ultra-long-thin network topology.

However, in foregoing ZigBee algorithm, the maximum number of child nodes of each node and the depth of the entire network are limited. Taking the ultra-long-thin network topology 200 illustrated in FIG. 2 as an example, at most two sub-routers can be connected to a node, namely, Cm=Rm=2. If the ZigBee address assigning method described above is adopted for assigning network addresses (i.e. using 16-bit network addresses), network addresses can be assigned to at most 15 levels of the network. Thus, the ZigBee address assigning method is not suitable for ultra-long-thin network which usually has a network depth greater than 15.

SUMMARY OF THE INVENTION

Accordingly, the present invention is directed to a network address assigning method for a long-thin wireless network, in which network addresses can be assigned to the long-thin wireless network having a network depth greater than 15.

The present invention is directed to a network address allocating method for a long-thin wireless network, in which the cost of packet transmission can be reduced.

The present invention is directed to a routing method for a long-thin wireless network, in which the routing efficiency of the network can be improved.

The present invention provides a network address assigning method for a long-thin wireless network. The network address assigning method includes following steps. A plurality of nodes in the long-thin wireless network is classified into a plurality of clusters, in which all the nodes ranging from a first node after each bridge node to the next bridge node in the long-thin wireless network are classified as the same cluster, the first node after each bridge node is classified as a cluster head node of the cluster, and the other nodes are classified as network nodes in the cluster. A network address is assigned to each of the nodes, in which the network address includes a cluster identification (ID) and a node ID, the cluster ID is used for identifying the clusters and for routing a packet between the clusters, and the node ID is used for identifying the nodes in each of the clusters and for routing a packet in the cluster.

According to an embodiment of the present invention, after the step of classifying the nodes in the long-thin wireless network into a plurality of clusters, the network address assigning method further includes establishing a hyper-logical network of the long-thin wireless network by using the root node and the cluster head nodes of the long-thin wireless network, in which the child nodes of the root node and the cluster head nodes are the first level of cluster head nodes connected after these nodes. Besides, the network address assigning method further includes defining the maximum number of sub cluster head nodes to be connected to each of the cluster head nodes in the hyper-logical network and the maximum network depth of the hyper-logical network.

According to an embodiment of the present invention, the step of assigning a cluster ID to each of the nodes includes calculating a skip parameter of each of the cluster head nodes according to the number of sub cluster head nodes, the network depth, and the depth of the cluster head node in the hyper-logical network and then assigning the cluster ID to the cluster head node according to the arrangement order of the cluster head node after its parent node and the skip parameter of its parent node.

According to an embodiment of the present invention, the calculation formula of the skip parameter includes:

$$CCskip(d) = \frac{1 - CCm^{CLm-d}}{1 - CCm}.$$

In foregoing calculation formula, CCm is the number of child nodes, CLm is network depth, d is the depth of each of the cluster head nodes in the hyper-logical network, and CCskip(d) is the skip parameter of depth d, in which CCm, CLm, d, and CCskip are integers.

According to an embodiment of the present invention, the step of assigning a cluster ID to each of the nodes includes assigning the cluster ID of each node in the long-thin wireless network as 0 when the number of sub cluster head nodes is defined to be 0 or 1.

According to an embodiment of the present invention, the step of assigning a cluster ID to each of the nodes includes assigning the cluster ID of the root node as 0 when the number of sub cluster head nodes is defined to be greater than 1.

According to an embodiment of the present invention, the step of assigning a cluster ID to each of the nodes includes assigning the cluster ID of the cluster of the $n^{th}$ sub cluster head node after the cluster head node at depth d in the hyper-logical network as $C_{parent}+(n-1)\times CCskip(d)+1$ when the number of sub cluster head nodes is defined to be greater than 1 and the cluster ID of the cluster head node in the hyper-logical network is $C_{parent}$, in which n is a positive integer.

According to an embodiment of the present invention, the step of assigning a node ID to each of the nodes includes assigning the node ID to the node according to the arrangement order of the nodes in each of the clusters.

According to an embodiment of the present invention, the node ID of each of the cluster head nodes is 0, and all the nodes in the same cluster have the same cluster ID.

The present invention provides a network address allocating method for a long-thin wireless network. The network address allocating method includes following steps. A long-thin wireless network is planned, and a plurality of nodes in the long-thin wireless network is classified into a plurality of clusters, in which all the nodes ranging from a first node after each bridge node to the next bridge node in the long-thin wireless network are classified as the same cluster, the first node after each bridge node is classified as a cluster head node of the cluster, and the other nodes are classified as network nodes in the cluster. A network address is assigned to each of the nodes, in which the network address includes a cluster ID and a node ID, the cluster ID is used for identifying the clusters, and the node ID is used for identifying the nodes in each of the clusters. A query packet is sent by any one of the nodes to the neighboring nodes of this node and address request packets sent back by the neighboring nodes are collected by this node so as to allocate network addresses to the neighbouring nodes.

According to an embodiment of the present invention, if the node sending the query packet is a bridge node, the node sequentially assigns cluster ID to cluster head nodes connected thereto, assigns 0 as the node ID of the cluster head nodes, and sequentially assigns node ID to the other nodes.

According to an embodiment of the present invention, if the node sending the query packet is not a bridge node, the node filters out the address request packets sent back by the cluster head nodes and sequentially assigns node ID to the other nodes.

According to an embodiment of the present invention, the step of sequentially assigning node ID to the other nodes includes sorting these nodes according to the signal strengths of the received address request packets and then sequentially assigning the node ID to the nodes according to the sorting result.

According to an embodiment of the present invention, the step of sending the query packet by any node to the neighbouring nodes thereof further includes sending a subsequent packet through this node to the neighbouring nodes thereof so as to appoint a next node for sending the query packet, in which whether these neighbouring nodes include any cluster head node or bridge node is determined, if the neighbouring nodes do not include any cluster head node or bridge node, a node having the maximum node ID is appointed as the next node for sending the query packet; otherwise, if the neighbouring nodes include a cluster head node or a bridge node, this node is appointed as the next node for sending the query packet.

The present invention provides a routing method for a long-thin wireless network. The routing method includes following steps. A long-thin wireless network is planed, and a plurality of nodes in the long-thin wireless network is classified into a plurality of clusters, in which all the nodes ranging from a first node after each bridge node to the next bridge node in the long-thin wireless network are classified as the same cluster. A network address is allocated to each node, in which the network address includes a cluster ID and a node ID, the cluster ID is used for identifying the clusters, and the node ID is used for identifying the nodes in each of the clusters. Any one node in the long-thin wireless network checks that whether the cluster ID of a destination node of a packet is the same as the cluster ID of this node. If the two cluster IDs are the same, a packet is routed in the cluster according to the node ID of the destination node. If the two cluster IDs are different, the packet is routed between the clusters according to the cluster ID of the destination node.

According to an embodiment of the present invention, the step of routing a packet in the cluster according to the node ID of the destination node includes comparing the node ID of the destination node and the node ID of the node having the packet, in which if the node ID of the destination node is greater than the node ID of the node having the packet, a neighboring node having greater node ID is selected from the same cluster as a next hop node, if the node ID of the destination node is smaller than the node ID of the node having the packet, a neighboring node having a smaller node ID is selected from the same cluster as the next hop node, and if the node ID of the destination node is equal to the node ID of the node having the packet, this node receives and processes the packet.

According to an embodiment of the present invention, the step of routing a packet between the clusters according to the cluster ID of the destination node includes: e1. comparing the cluster ID of the destination node and the cluster ID of the node having the packet; e2. determining whether the node having the packet has any neighboring node in different cluster if the cluster ID of the destination node is greater than the cluster ID of the node having the packet and the cluster of the destination node is a sub cluster of the cluster of the node having the packet, in which if the node having the packet has a neighbouring node in a different cluster and the cluster of the neighbouring node is a sub cluster of the cluster of the node having the packet while the cluster of the destination node is a sub cluster of the cluster of the neighbouring node, the neighbouring node is selected as the next hop node; otherwise, if the node having the packet has no neighbouring node in a different cluster, a neighbouring node having a greater node ID is selected from the same cluster as the next hop node; e3. determining whether the node having the packet has a neighbouring node in a different cluster in a situation other than that described in step e2., in which if the node having the packet has a neighbouring node in a different cluster and the cluster of the neighbouring node is a sub cluster of the cluster of the node having the packet, the neighbouring node is selected as the next hop node; otherwise, if the node having the packet does not have a neighbouring node in a different cluster, a neighbouring node having a smaller node ID is selected from the same cluster as the next hop node.

The present invention provides a network address assigning and allocating method and a routing method regarding the characteristics of a long-thin wireless network, in which the network nodes in the long-thin wireless network are logically classified into a plurality of clusters, and the network addresses are divided into different sections. Thereby, the routing and network transmitting efficiency of an ultra-long-thin wireless network can be improved without increasing the load of the ZigBee network. Moreover, network addresses can be assigned to a network having its network depth greater than 15.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 3:
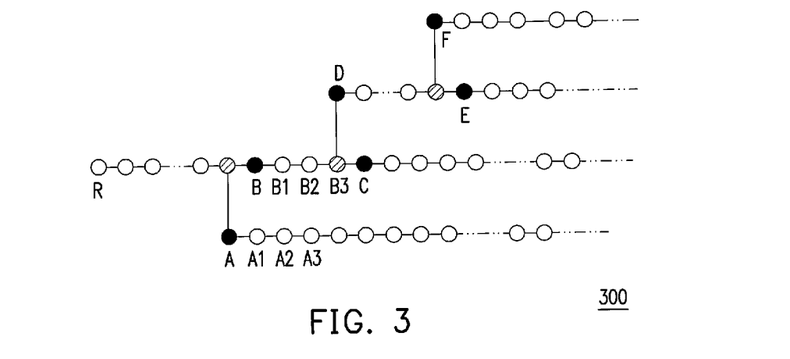
FIG. 3 illustrates an example of a long-thin wireless network according to an embodiment of the present invention.

The present invention provides a network address assigning method suitable for an ultra-long-thin wireless network. Assuming that all the nodes in the network are ZigBee routers, namely, each node in the network can be connected with sub routers, the base station then plays the role of a ZigBee coordinator. Additionally, two new node classifications are added in the present invention, in which one of the node classifications is cluster head node, and the other one is bridge node. A bridge node is a node for connecting long-thin nodes, and a cluster head node is the first node after a bridge node for connecting long-thin nodes and the bridge node. FIG. 3 illustrates an example of a long-thin wireless network according to an embodiment of the present invention. Referring to FIG. 3, the nodes marked with diagonals are bridge nodes, and the black nodes connected thereto are cluster head nodes. Besides, all the nodes ranging from a cluster head node to the next bridge node are considered in the same cluster. For example, the nodes B1, B2, and B3 in FIG. 3 are in the cluster established by the node B.

Figure 4:
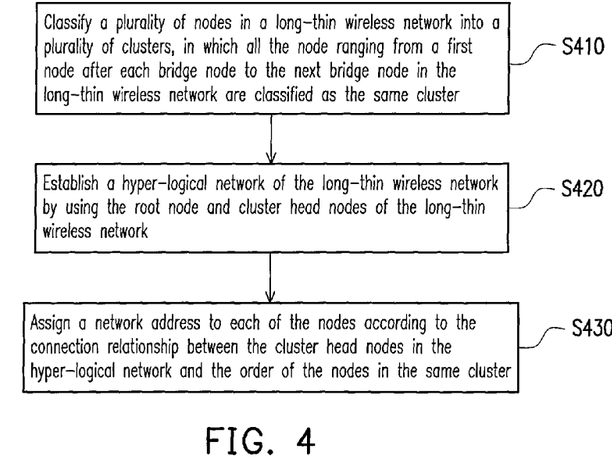
FIG. 4 is a flowchart of a network address assigning method for a long-thin wireless network according to an embodiment of the present invention.

The present invention provides a network address assigning method regarding to foregoing structure of long-thin wireless network. FIG. 4 is a flowchart of a network address assigning method for a long-thin wireless network according to an embodiment of the present invention. Referring to FIG. 4, in the present embodiment, the nodes in the long-thin wireless network are classified into a plurality of clusters, and unique cluster ID and node ID are respectively assigned to these nodes as the network addresses thereof. The detailed steps of the network address assigning method will be described below.

First, the nodes in the long-thin wireless network are classified into a plurality of clusters, in which all the nodes ranging from a first node after each bridge node to the next bridge node in the long-thin wireless network are classified as the same cluster (step S410), and the first node after the bridge node is classified as a cluster head node of the cluster (for example, the node B in FIG. 3), and the other nodes are classified as network nodes in the cluster (for example, the nodes B1, B2, and B3 in FIG. 3).

Next, a hyper-logical network of the long-thin wireless network is established with the root node and the cluster head nodes of the long-thin wireless network (step S420). The child nodes of the root node or each of the cluster head nodes are the first level of cluster head nodes connected after the node.

Figure 5:
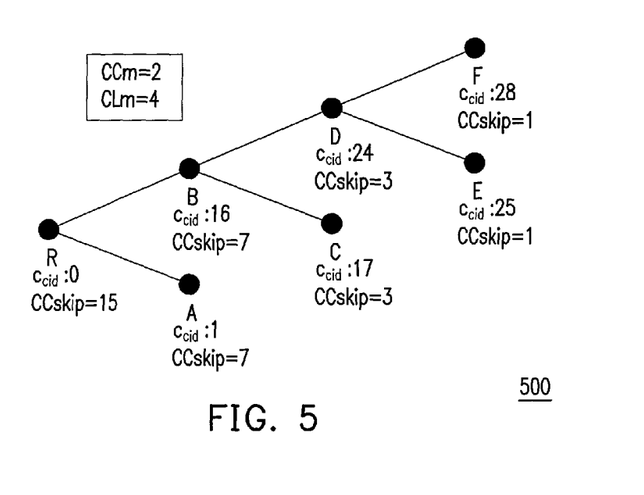
FIG. 5 is a diagram of a hyper-logical network corresponding to the long-thin wireless network in FIG. 3.

FIG. 5 is a diagram of a hyper-logical network corresponding to the long-thin wireless network in FIG. 3. Referring to FIG. 5, the hyper-logical network 500 is established by using the base station of the long-thin wireless network as its root node and the cluster head nodes in the long-thin wireless network as its child nodes, and the members of the hyper-logical network 500 include a root node R and cluster head nodes A~F.

It should be mentioned that similar to the definition in the ZigBee specification, the present invention also defines the maximum number (CCm) of child nodes connected to each cluster head node in the hyper-logical network 500 and the maximum network depth (CLm) of the hyper-logical network 500 so as to allocate unique cluster ID to the root node R and the cluster head nodes A~F in the hyper-logical network 500.

Referring to FIG. 4 again, after the hyper-logical network is established, a network address is assigned to each of the nodes according to the connection of the cluster head nodes in the hyper-logical network and the arrangement order of the nodes in the same cluster (step S330). It should be noted that in the present embodiment, 16-bit network addresses are used for routing packets, and each of the network addresses includes a cluster ID and a node ID, in which the bit numbers of the cluster ID and the node ID are determined according to the actual requirement but not limited in the present invention.

Figure 6:
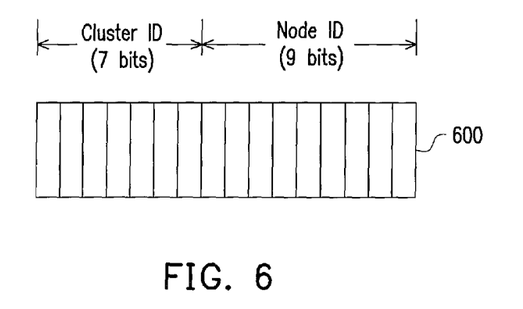
FIG. 6 illustrates an example of a network address.

FIG. 6 illustrates an example of a network address. Referring to FIG. 6, the first 7 bits of the network address 600 represent the cluster ID, and the last 9 bits thereof represents the node ID. The cluster ID is used for identifying the clusters and for routing a packet between the clusters, and the node ID is used for identifying the nodes in each of the clusters and for routing a packet in the cluster.

To be specific, in step S430, a skip parameter of each cluster head node is calculated according to the number of child nodes (CCm), the network depth (CLm), and the depth d of each cluster head node in the hyper-logical network, and the calculation formula is:

$$CCskip(d) = \frac{1 - CCm^{CLm-d}}{1 - CCm}.$$

In foregoing calculation formula, CCm, CLm, and CCskip are all integers. According to the present invention, a cluster ID is assigned to each of the cluster head nodes according to the skip parameter of a parent node of the cluster head node and the arrangement order of the cluster head node after its parent node, in which when the number of child nodes (CCm) is 0 or 1, which means the network has no bridge node and accordingly the entire network has only one cluster, the cluster ID of each node in the long-thin wireless network is allocated as 0.

However, when the number of child nodes (CCm) is defined to be greater than 1, the cluster ID of each node in the long-thin wireless network is allocated as:

1. assigning the depth of the root node (i.e. the base station) as 0 and the cluster ID thereof as 0.

2. assigning the cluster ID of the cluster of the $n^{th}$ sub cluster head node after the cluster head node at depth d in the hyper-logical network as $C_{parent}+(n-1) \times CCskip(d)+1$ when the cluster ID of the cluster head node is $C_{parent}$, in which n is a positive integer.

3. assigning the cluster ID of the other nodes in the same cluster as the same as the cluster ID of the cluster head node in the cluster.

FIG. 5 illustrates the cluster ID assigned to the nodes in the hyper-logical network 500. Assuming that at most 2 (i.e. CCm=2) child nodes can be connected to each node in the hyper-logical network 500 and the maximum network depth of the hyper-logical network 500 is 4 (i.e. CLm=4), the skip parameter of the root node R can be obtained as CCskip(0)= 15 by bringing CCm and CLm into foregoing formula (2).

On the other hand, in the present embodiment, it is assumed that the node A is the first child node after the root node R, then the cluster ID of the node A is assigned as $c_{id}=0+(1-1) \times 15+1=1$ and the cluster ID of the node B is assigned as $c_{id}=0+(2-1) \times 15+1=16$. After that, the skip parameter of the nodes A and B can be obtained as CCskip(1)=7 through foregoing formula (2), and assuming that the node C is the first node after the node B, then the cluster ID of the node C is assigned as $c_{id}=16+(1-1) \times 7+1=17$ and the cluster ID of the node D is assigned as $c_{id}=16+(2-1) \times 7+1$ 24. As described above, the cluster ID of the other nodes are assigned until the result in FIG. 5 is obtained.

After the cluster ID of each cluster head node is assigned, in the present embodiment, the node ID of each cluster head node is further assigned as 0. After that, the node ID of the network nodes are further assigned according to the arrangement order of the network nodes in each of the clusters. Taking the long-thin wireless network illustrated in FIG. 3 as an example, the nodes have 5-bit cluster ID and 1'-bit node ID, and accordingly, the network address assigning result is obtained as shown in following table 1.

TABLE 1

| Node symbol | Network address | |
| --- | --- | --- |
| | Cluster ID | Node ID |
| A  | 00001 | 00000000000 |
| A1 | 00001 | 00000000001 |
| A2 | 00001 | 00000000010 |
| A3 | 00001 | 00000000011 |
| B  | 10000 | 00000000000 |
| B1 | 10000 | 00000000001 |
| B2 | 10000 | 00000000010 |
| B3 | 10000 | 00000000011 |

It should be noted that the actual implementation of the long-thin network system in the present invention can be divided into two phases. The first phase is the network planning and deploying phase described above, and the second phase is the network initialization phase. In short, during the first phase, the format of the network address, the number of child nodes (CCm), and the network depth (CLm) are to be further determined besides the positions of the base station, the cluster head nodes, the bridge nodes, and the other nodes in the network. The network initialization phase is entered, namely, the network addresses are allocated to the nodes, according to the information of the network planning.

There are two network address allocating methods, in which the first one is a manual network address allocating method, and the other one is an automatic network address allocating method. According to the manual network address allocating method, network addresses are directly assigned when each node program is recorded or manufactured, and the network is then deployed according to the network planning and the network address assigning blueprint. However, the labor cost for establishing the network is quite high by using the manual network address allocating method. Compared to the manual method, the automatic network address allocating method has better performance, and which will be described in detail below with reference to an embodiment of the present invention.

Figure 7:
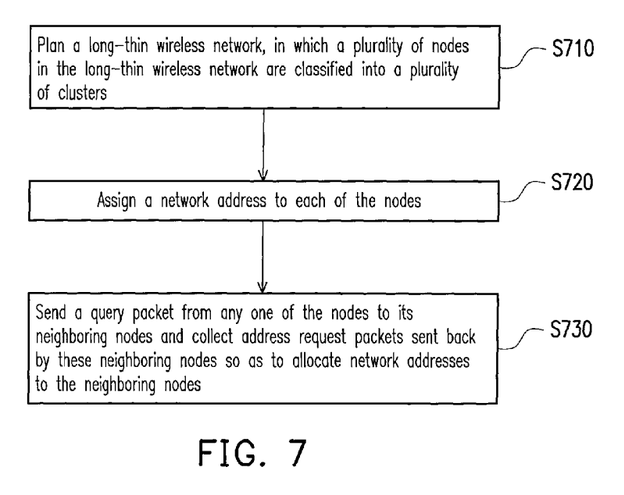
FIG. 7 is a flowchart of a network address allocating method for a long-thin wireless network according to an embodiment of the present invention.

FIG. 7 is a flowchart of a network address allocating method for a long-thin wireless network according to an embodiment of the present invention. Referring to FIG. 7, in the present embodiment, after the network nodes have been deployed according to the planning blueprint, information of neighbouring nodes is collected through packet transmission, so as to send the network address to each of the nodes. Detailed steps in foregoing process will be described below.

First, the long-thin wireless network is planed, in which a plurality of nodes in the long-thin wireless network is classified into a plurality of clusters (step S710). To be specific, in this step, all the nodes ranging from a first node after each bridge node to the next bridge node in the long-thin wireless network are classified as the same cluster, the first node after each bridge node is classified as a cluster head node of the cluster, and the other nodes are classified as network nodes in the cluster.

Next, a network address is assigned to each of the nodes (step S720), in which the network address includes a cluster ID and a node ID, the cluster ID is used for identifying the clusters, and the node ID is used for identifying the nodes in each of the clusters. Foregoing steps are the same or similar to the steps S410 and S420 in foregoing embodiment therefore will not be described herein.

However, in the present embodiment, after the network is deployed, any one of the nodes sends a query packet to the neighbouring nodes thereof and collects address request packets sent back by these neighbouring nodes, so as to allocate the network addresses of the neighbouring nodes (step S730).

To be specific, in this step, the base station first appoints its own network address as 0x0000, and then broadcasts a query packet. When a particular node in the network receives the query packet and no network address is yet assigned to the node, the node sends an address request packet back to the node which sends the query packet.

When the node receives the address request packet, it first checks whether the node sending the address request packet is a neighbouring node. If the node sending the address request packet is a neighbouring node, the node receives the address request packet, otherwise it skips it. The node sending the query packet then waits and collects the address request packets sent back by the neighbouring nodes which have not been assigned with any network address. The node keeps sending the query packet if there is still neighbouring node which is not assigned of any network address and does not send back any address request packet. After the node sending the query packet finishes collecting the address request packets, it executes following process:

1. when the node sending the query packet is a bridge node, it sequentially assigns a cluster ID to the cluster head nodes connected thereto, assigns the node ID of these cluster head nodes as 0, and sequentially assigns node ID to the other nodes.

2. when the node sending the query packet is not a bridge node, it only assigns network addresses to those nodes which are not cluster head nodes. Thus, the node filters out the address request packets sent back by the cluster head nodes and then sequentially assigns node ID to the other nodes.

It should be noted that in foregoing process, the node sending the query packet may first sort the nodes according to the signal strengths of the received address request packets and then assign the cluster ID or node ID to the nodes according to the sorting result. However, such a sorting method is only an example of the present embodiment but not for limiting the present invention, and those skilled in the art should be able to use other methods according to the actual requirement to assign the cluster ID or node ID.

After the cluster ID and node ID are assigned, the node sending the query packet sends an address allocating packet to the neighbouring nodes thereof, so as to send the allocated network addresses to these neighbouring nodes. In addition, the node sending the query packet also sends a subsequent packet to the neighbouring nodes thereof to appoint a next node for sending the query packet. First, the node sending the query packet determines whether there is any cluster head node or bridge node among the neighbouring nodes, in which if there is no cluster head node or bridge node among the neighbouring nodes, the node sending the query packet appoints the node having the largest node ID as the next node for sending the query packet; otherwise, if there is a cluster head node or bridge node among the neighbouring nodes, the node sending the query packet appoints this node as the next node for sending the query packet. The node which receives the subsequent packet repeats foregoing steps to send the query packet to nodes connected thereto to assign network addresses further.

Figure 8:
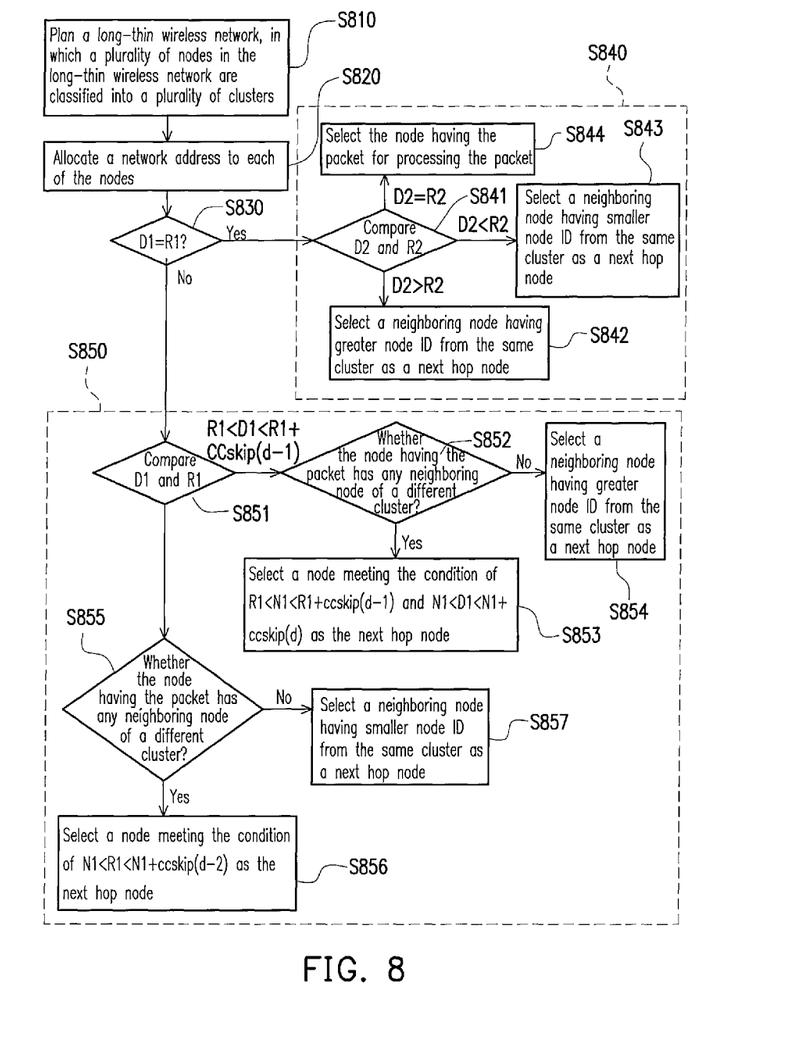
FIG. 8 is a flowchart of a routing method for a long-thin wireless network according to an embodiment of the present invention.

After a network address is allocated to each of the nodes, the packet routing between the nodes can be performed according to the allocated network addresses. FIG. 8 is a flowchart of a routing method for a long-thin wireless network according to an embodiment of the present invention. Referring to FIG. 8, according to the routing method in the present embodiment, when each node in the long-thin wireless network receives a packet, how the packet is processed is determined as following.

First, a long-thin wireless network is planed, in which a plurality of nodes in the long-thin wireless network are classified into a plurality of clusters (step S810). To be specific, in this step, all the nodes ranging from a first node after each bridge node to the next bridge node in the long-thin wireless network are classified as the same cluster, the first node after each bridge node is classified as a cluster head node of the cluster, and the other nodes are classified as network nodes in the cluster.

Next, a network address is allocated to each of the nodes (step S820), in which the network address includes a cluster ID and a node ID, the cluster ID is used for identifying the clusters, and the node ID is used for identifying the nodes in each of the clusters. Foregoing steps are the same or similar to steps in foregoing embodiment therefore will not be described herein.

After the network addresses are allocated, whenever any node in the long-thin wireless network receives a packet, whether the cluster ID of the destination node of the packet is the same as the cluster ID of the current node is determined (step S830). For the convenience of description, in the present embodiment, it is assumed that the cluster ID of the node having the packet is R1, the node ID thereof is R2, the cluster ID of the destination node is D1, the node ID thereof is D2, and the depth of the node having the packet in the hyper-logical network is d.

Back to step S830, if the cluster IDs are the same (i.e. D1=R1), the packet is routed in the cluster according to the node ID of the destination node (step S840); otherwise, if the cluster IDs are different, the packet is routed between the clusters according to the cluster ID of the destination node (step S850).

To be specific, in step S840, the node having the packet first compares the node ID thereof with the node ID of the destination node (step S841). If the node ID of the destination node is greater than the node ID of the node having the packet (i.e. D2>R2), a neighbouring node having a greater node ID is selected from the same cluster as a next hop node (step S842); if the node ID of the destination node is smaller than the node ID of the node having the packet (i.e. D2<R2), a neighbouring node having a smaller node ID is selected from the same cluster as the next hop node (step S843); and if the node ID of the destination node is equal to the node ID of the node having the packet (i.e. D2=R2), the node having the packet processes the packet (step S844).

On the other hand, in step S850, the node having the packet compares the cluster ID thereof with the cluster ID of the destination node (step S851). If the cluster ID of the destination node is greater than the cluster ID of the node having the packet (i.e. D1>R1) and the cluster (cluster IDD1) of the destination node is a sub cluster of the cluster (cluster IDR1) of the node having the packet (i.e. R1<D1<R1+CCskip(d−1)), whether the node having the packet has any neighbouring node in a different clusters is further determined (step S852). If the node having the packet has a neighbouring node in a different cluster and the cluster (cluster IDN1) of the neighbouring node is a sub cluster of the cluster (cluster IDR1) of the node having the packet (i.e. R1<N1<R1+CCskip(d−1)) while the cluster (cluster IDD1) of the destination node is a sub cluster of the cluster (cluster IDN1) of the neighbouring node (i.e. N1<D1<N1+CCskip(d)), the neighbouring node is selected as the next hop node (step S853); if foregoing neighbouring node is not found, a neighbouring node having a greater node ID is selected from the same cluster (cluster IDR1) as the next hop node (step S854).

On the other hand, in the situation other than that described in the step S852, whether the node having the packet has a neighbouring node in a different cluster is further determined (step S855). If the node has a neighboring node in a different cluster and the cluster (cluster IDN1) of the neighbouring node is a sub cluster of the cluster (cluster IDR1) of the node having the packet (i.e. N1<R1<N1+CCskip(d−2)), this neighbouring node is served as the next hop node (step S856); if foregoing neighbouring node is not found, a neighbouring node having a smaller node ID is selected form the same cluster (cluster IDR1) as the next hop node (step S857).

In overview, the present invention provides a network address assigning and allocating method and a routing method especially designed regarding the structure of a long-thin wireless network. Thus, these methods are suitable for a long-thin wireless network, especially for a long-thin network having its network depth greater than 15. According to the present invention, the cost for packet transmission is reduced, and the routing efficiency of the network is improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A network address assigning method for a long-thin wireless network, comprising:
   a. classifying a plurality of nodes in the long-thin wireless network into a plurality of clusters, wherein all the nodes ranging from a first node after each bridge node to the next bridge node in the long-thin wireless network are classified as the same cluster, the first node after each bridge node is classified as a cluster head node of the cluster, and each of the other nodes is classified as a network node in the cluster;
   a1. establishing a hyper-logical network of the long-thin wireless network by using a root node and the cluster head nodes of the long-thin wireless network, wherein the child nodes of the root node and each of the cluster head nodes are the first level of cluster head nodes connected to the root node and the cluster head node;
   a2. defining a maximum number of child nodes to be connected to the cluster head node and a maximum network depth of the hyper-logical network; and
   b. assigning a network address to each of the nodes, wherein the network address comprises a cluster ID and a node ID, the cluster ID is used for identifying the clusters and routing a packet between the clusters, and the node ID is used for identifying the nodes in each of the clusters and routing a packet in the cluster,
   wherein step b. comprises:
   calculating a skip parameter of each of the cluster head nodes according to the number of child nodes, the network depth, and the depth of the cluster head node in the hyper-logical network; and
   assigning the cluster ID to each of the cluster head nodes according to the arrangement order of the cluster head node after a parent node thereof and the skip parameter of the parent node.

2. The network address assigning method according to claim 1, wherein the calculation formula of the skip parameter comprises:

$$CCskip(d) = \frac{1 - CCm^{CLm-d}}{1 - CCm},$$

wherein CCm is the number of child nodes, CLm is the network depth, d is the depth of each of the cluster head nodes in the hyper-logical network, and CCskip(d) is the skip parameter at depth d, wherein CCm, CLm, d, and CCskip are integers.

3. The network address assigning method according to claim 2, wherein step b. comprises:
   assigning the cluster ID of each of the nodes in the long-thin wireless network as 0 when the number of child nodes is defined to be 0 or 1.

4. The network address assigning method according to claim 3, wherein step b. comprises:
   assigning the cluster ID of the root node as 0 when the number of child nodes is defined to be greater than 1.

5. The network address assigning method according to claim 3, wherein step b. comprises:
   assigning the cluster ID of the cluster of the $n^{th}$ child node after the cluster head node at depth d as Cparent+(n−1)×CCskip(d)+1 when the number of child nodes is defined to be greater than 1 and the cluster ID of the cluster head node is $C_{parent}$, wherein n is a positive integer.

6. The network address assigning method according to claim 1, wherein step b. comprises:
   assigning the node ID to each of the nodes according to the arrangement order of the nodes in each of the clusters.

7. The network address assigning method according to claim 1, wherein the node ID of each of the cluster head node is 0.

8. The network address assigning method according to claim 1, wherein the cluster ID of all the nodes in the same cluster are the same.

9. A network address allocating method for a long-thin wireless network, comprising:
   a. planning a long-thin wireless network, wherein a plurality of nodes in the long-thin wireless network are classified into a plurality of clusters, all the nodes ranging from a first node after each bridge node to the next bridge node in the long-thin wireless network are classified as the same cluster, the first node after each bridge node is classified as a cluster head node of the cluster, and the other nodes are classified as network nodes in the cluster;

b. assigning a network address to each of the nodes, wherein the network address comprises a cluster ID and a node ID, the cluster ID is used for identifying the clusters, and the node ID is used for identifying the nodes in each of the clusters; and c. sending a query packet by any one of the nodes to the neighbouring nodes of the node, and collecting an address request packet sent back by each of the neighbouring nodes so as to allocating the network addresses to the neighbouring nodes, wherein if the node sending the query packet in step c. is a bridge node, cluster ID is sequentially assigned to the cluster head nodes connected to the node, the node ID of each of the cluster head nodes is assigned as 0, and node ID is sequentially assigned to the other nodes.

10. The network address allocating method according to claim 9, wherein if the node sending the query packet in step c. is not a bridge node, the address request packets sent back by the cluster head nodes are filtered out, and node ID is sequentially assigned to the other nodes.

11. The network address allocating method according to claim 10, wherein the step of sequentially assigning node ID to the other nodes comprises:
   sorting the nodes according to the signal strengths of the address request packets; and
   sequentially assigning node ID to the nodes according to the sorting result.

12. The network address allocating method according to claim 9, wherein step c. further comprises:
   sending a subsequent packet to the neighbouring nodes to appoint a next node for sending the query packet.

13. The network address allocating method according to claim 12, wherein the step of sending the subsequent packet to the neighbouring nodes to appoint the next node for sending the query packet comprises:
   determining whether the neighbouring nodes comprise a cluster head node or a bridge node;
   appointing the node having the largest node ID as the next node for sending the query packet if the neighbouring nodes comprise no cluster head node or bridge node; and
   appointing the node as the next node for sending the query packet if the neighbouring nodes comprise a cluster head node or a bridge node.

14. A routing method for a long-thin wireless network, comprising:
   a. planning a long-thin wireless network, wherein a plurality of nodes in the long-thin wireless network is classified into a plurality of clusters, and all the nodes ranging from a first node after each bridge node to the next bridge node in the long-thin wireless network are classified as the same cluster;
   b. allocating a network address to each of the nodes, wherein the network address comprises a cluster ID and a node ID, the cluster ID is used for identifying the clusters, and the node ID is used for identifying the nodes in each of the clusters;
   c. checking whether the cluster ID of a destination node of a packet is the same as the cluster ID of any one of the nodes by using the node;
   d. routing the packet in the cluster according to the node ID of the destination node if the cluster ID of the destination node is the same as the cluster ID of the node; and
   e. routing the packet between the clusters according to the cluster ID of the destination node if the cluster ID of the destination node is different from the cluster ID of the node,
   wherein step d. comprises:
   comparing the node ID of the destination node and the node ID of the node having the packet;
   selecting the neighbouring node having greater node ID from the same cluster as the next hop node if the node ID of the destination node is greater than the node ID of the node having the packet; and
   selecting the neighbouring node having smaller node ID from the same cluster as the next hop node if the cluster ID of the destination node is smaller than the node ID of the node having the packet.

15. The routing method according to claim 14, wherein step d. further comprises:
   selecting the node for receiving and processing the packet if the node ID of the destination node is equal to the node ID of the node having the packet.

16. The routing method according to claim 14, wherein step e. comprises:
   e1. comparing the cluster ID of the destination node and the cluster ID of the node having the packet; and
   e2. determining whether the node having the packet has a neighbouring node in a different cluster if the cluster ID of the destination node is greater than the cluster ID of the node having the packet and the cluster of the destination node is a sub cluster of the cluster of the node having the packet, wherein
   if the node having the packet has a neighbouring node in a different cluster and the cluster of the neighbouring node is a sub cluster of the cluster of the node having the packet while the cluster of the destination node is a sub cluster of the cluster of the neighbouring node, the neighbouring node is appointed as the next hop node, and
   if the node having the packet does not have a neighbouring node in a different cluster, a neighbouring node having a greater node ID is selected from the same cluster as the next hop node.

17. The routing method according to claim 16, wherein step e. further comprises:
   e3. determining whether the node having the packet has a neighbouring node in a different cluster in situation other than that described in step e2., wherein
   if the node having the packet has a neighbouring node in a different cluster and the cluster of the neighbouring node is a sub cluster of the cluster of the node having the packet, the neighbouring node is appointed as the next hop node, and
   if the node having the packet does not have a neighbouring node in a different cluster, a neighbouring node having a smaller node ID is selected form the same cluster as the next hop node.

* * * * *